United States Patent
Lee et al.

(10) Patent No.: US 12,503,530 B2
(45) Date of Patent: *Dec. 23, 2025

(54) POLYETHYLENE YARN HAVING IMPROVED POST-PROCESSABILITY, AND FABRIC COMPRISING SAME

(71) Applicant: KOLON INDUSTRIES, INC., Seoul (KR)

(72) Inventors: Sinho Lee, Seoul (KR); Young Soo Lee, Seoul (KR); Seong-Young Kim, Seoul (KR); Jung Eun Park, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 376 days.

This patent is subject to a terminal disclaimer.

(21) Appl. No.: 18/043,037

(22) PCT Filed: Jun. 21, 2022

(86) PCT No.: PCT/KR2022/008770
§ 371 (c)(1),
(2) Date: Feb. 26, 2023

(87) PCT Pub. No.: WO2023/277428
PCT Pub. Date: Jan. 5, 2023

(65) Prior Publication Data
US 2023/0322979 A1   Oct. 12, 2023

(30) Foreign Application Priority Data

Jun. 29, 2021  (KR) ........................ 10-2021-0084613

(51) Int. Cl.
*C08F 110/02*  (2006.01)
*D01F 6/04*  (2006.01)
*D02G 3/44*  (2006.01)

(52) U.S. Cl.
CPC .............. *C08F 110/02* (2013.01); *D01F 6/04* (2013.01); *D02G 3/44* (2013.01)

(58) Field of Classification Search
None
See application file for complete search history.

(56) References Cited

U.S. PATENT DOCUMENTS

| 4,228,118 | A |  | 10/1980 | Wu |  |
| 4,839,228 | A |  | 6/1989 | Jezic |  |
| 2023/0357965 | A1 | * | 11/2023 | Lee | ........................... D02G 3/02 |
| 2023/0357966 | A1 | * | 11/2023 | Lee | ........................... D01F 6/04 |
| 2025/0011976 | A1 | * | 1/2025 | Lee | ........................... D02J 1/22 |

(Continued)

FOREIGN PATENT DOCUMENTS

| CN | 88102519 A | 11/1988 |
| CN | 101103147 B | 2/2012 |
| JP | H04222206 A | 8/1992 |

(Continued)

*Primary Examiner* — Arti Singh-Pandey
(74) *Attorney, Agent, or Firm* — Harvest IP Law, LLP

(57) ABSTRACT

Provided is a polyethylene yarn having improved post-processability, and more particularly, a polyethylene yarn which maintains excellent mechanical properties even in a harsh environment such as a high temperature to have improved post-processability such as dyeing or coating is provided.

10 Claims, 1 Drawing Sheet

(56) References Cited

U.S. PATENT DOCUMENTS

2025/0034760 A1\* 1/2025 Lee ..................... D03D 15/283

FOREIGN PATENT DOCUMENTS

| | | |
|---|---|---|
| JP | 2002-194616 A | 7/2002 |
| JP | 2022551745 A | 12/2002 |
| JP | 2017531702 A | 10/2017 |
| JP | 2022507212 A | 1/2022 |
| JP | 2022526113 A | 5/2022 |
| KR | 20160059653 A | 5/2016 |
| KR | 20180120373 A | 11/2018 |
| KR | 10-2019-0003016 A | 1/2019 |
| KR | 10-2092934 B1 | 3/2020 |
| KR | 102146097 B1 | 8/2020 |
| KR | 102178645 B1 | 11/2020 |
| KR | 102230748 B1 | 3/2021 |
| WO | 2011102186 A1 | 8/2011 |

\* cited by examiner

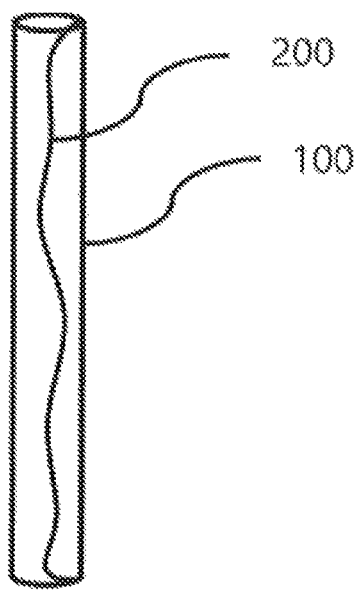

POLYETHYLENE YARN HAVING IMPROVED POST-PROCESSABILITY, AND FABRIC COMPRISING SAME

CROSS REFERENCE TO RELATED APPLICATION(S)

This application is a National Stage of International Application No. PCT/KR2022/008770 filed Jun. 21, 2022, claiming priority based on Korean Patent Application No. 10-2021-0084613 filed Jun. 29, 2021, the disclosures of which are incorporated herein by reference in their entireties.

TECHNICAL FIELD

The following disclosure relates to a polyethylene yarn having improved post-processability and a fabric including the same.

BACKGROUND

Since a polyethylene resin is inexpensive, has chemical resistance, and has product processability, it is increasingly used for engineering plastic, film fiber, and non-woven fabric. It is manufactured into a monofilament or a multi-filament in the textile field, and its use is expanding for clothing, industrial use, and the like. In particular, according to the latest textile trends, interest in high functional polyethylene fiber requiring high strength and high elasticity is growing.

In U.S. Pat. No. 4,228,118, a polyethylene resin having a number average molecular weight of 20,000 and a weight average molecular weight of 125,000 or less is wound at a spinning temperature of 220 to 335° C. and at a minimum spinning speed of 30 m/min using, and then is drawn 20 times or more, thereby manufacturing a fiber of 10 to 20 g/d. However, the method has a low spinning speed due to the number of nozzle holes and a spin draw method to have a limitation in an output, and has a difficulty in producing a polyethylene fiber having excellent uniformity and spinning workability in producing tens to hundreds of multifilaments.

In general, the polyethylene fiber may be used in various applications including safety goods, leisure, and household goods, due to its unique characteristics such as high strength, light weight, and chemical resistance. However, since the polyethylene fiber has a low melting point as compared with a polyethylene terephthalate fiber, a polyamide fiber, or the like having a relatively high melting point, its physical properties are easily deteriorated at a high temperature, and thus, the possible post-processing conditions are limited. Manufacture of a polyethylene yarn which solves the problems to maintain the mechanical properties even in the case of post-processing at a high temperature is urgently needed.

SUMMARY

An embodiment of the present invention is directed to providing a polyethylene yarn which maintains mechanical properties even in a high-temperature environment to have improved post-processability.

Another embodiment of the present invention is directed to providing a fabric including a polyethylene yarn having improved post-processability to have excellent mechanical properties.

In one general aspect, a polyethylene yarn has a melting index (MI) of 0.3 to 3 g/10 min as measured in accordance with ASTM D1238, a ratio (B/A) of a tenacity (B) measured after a heat treatment at 120° C. for 30 minutes to a tenacity (A) measured at room temperature of 85% or more, and a ratio (C/A) of a tenacity (C) measured after a heat treatment at 50° C. for 30 minutes to the tenacity (A) measured at room temperature of 90% or more, in accordance with ASTM D885.

In the polyethylene yarn according to an exemplary embodiment of the present invention, the polyethylene yarn may have a crystallinity of 60 to 85%.

In the polyethylene yarn according to an exemplary embodiment of the present invention, the polyethylene yarn may have a crystal size in a fiber axis parallel direction (002 plane) of 200 Å or more and a crystal size in a fiber axis orthogonal direction (110 plane) of 110 Å or more as measured with an X-ray diffraction pattern using CuK α rays.

In the polyethylene yarn according to an exemplary embodiment of the present invention, the polyethylene yarn may have a melting temperature of 130 to 140° C.

In the polyethylene yarn according to an exemplary embodiment of the present invention, the polyethylene yarn may have a density of 0.93 to 0.97 g/cm$^3$.

In the polyethylene yarn according to an exemplary embodiment of the present invention, the polyethylene yarn may have a dry heat shrinkage of 2.5% or more.

In the polyethylene yarn according to an exemplary embodiment of the present invention, the polyethylene yarn may have a strength of 1 to 20 g/d as measured in accordance with ASTM D2256.

In the polyethylene yarn according to an exemplary embodiment of the present invention, the polyethylene yarn may have a cutting elongation of 20% or less as measured in accordance with ASTM D2256.

In another general aspect, a fabric includes the polyethylene yarn described above.

In the fabric according to an exemplary embodiment of the present invention, the fabric may have a wear resistance degree (cycles) of 500 or more.

Other features and aspects will be apparent from the following detailed description, the drawings, and the claims.

BRIEF DESCRIPTION OF THE DRAWINGS

FIG. 1 is a schematic diagram of measuring a tenacity of a polyethylene yarn according to an exemplary embodiment of the present invention.

DETAILED DESCRIPTION OF MAIN ELEMENTS

100: cylindrical glass tube
200: polyethylene yarn

DETAILED DESCRIPTION OF EMBODIMENTS

Hereinafter, a preferred exemplary embodiment of the present invention will be described in detail with reference to the drawings attached to the present invention. In describing the present invention, detailed description of related known functions or configurations will be omitted in order not to obscure the gist of the present invention.

The following specific examples or exemplary embodiments are only a reference for describing the present invention in detail, and the present invention is not limited thereto, and may be implemented in various forms.

In the present invention, unless otherwise defined, all technical terms and scientific terms have the same meanings as those commonly understood by a person skilled in the art to which the present invention pertains. The terms used in the description of the present invention are only for effectively describing a certain exemplary embodiment, and are not intended to limit the present invention.

In addition, the singular form used in the specification may be intended to also include a plural form, unless otherwise indicated in the context.

In addition, unless explicitly described to the contrary, "comprising" any components will be understood to imply the inclusion of other elements rather than the exclusion of any other elements.

Hereinafter, units used without particular mention are based on weights, and as an example, a unit of % or ratio refers to a wt % or a weight ratio.

The present inventors noted that a polyethylene yarn has unique properties such as high tenacity, light weight, and chemical resistance and has excellent cool feeling properties from high crystallinity, but has a low melting point and is vulnerable to a high temperature, and thus, its post-processing is very difficult. Accordingly, the present inventors deepened their studies, and found that when a polyethylene yarn satisfies a certain melting index and certain tenacity conditions, high crystallinity and mechanical properties are maintained even after post-processing, thereby completing the present invention.

In the present specification, the polyethylene yarn refers to a monofilament and a multifilament manufactured by a process such as spinning and drawing, using polyethylene chips as a raw material. As an example, the polyethylene yarn may include 40 to 500 filaments each having a fineness of 1 to 3 deniers, and may have a total fineness of 100 to 1,000 deniers.

The polyethylene yarn according to the present invention has a melting index (MI) of 0.3 to 3 g/10 min as measured at 190° C., 2.16 kg in accordance with ASTM D1238, a ratio (B/A) of a tenacity (B) measured after a heat treatment at 120° C. for 30 minutes to a tenacity (A) measured at room temperature of 85% or more, and a ratio (C/A) of a tenacity (C) measured after a heat treatment at 50° C. for 30 minutes to the tenacity (A) measured at room temperature of 90% or more, in accordance with ASTM D885.

Specifically, the ratio (B/A) of the tenacity (B) measured after a heat treatment at 120° C. for 30 minutes to the tenacity (A) measured at room temperature may be 87% or more, advantageously 90% or more. In addition, the ratio (C/A) of the tenacity (C) measured after a heat treatment at 50° C. for 30 minutes to the tenacity (A) measured at room temperature may be 92% or more, advantageously 95% or more.

In addition, the melting index (MI) may be advantageously 0.4 to 3 g/mol, and more advantageously 0.7 to 3 g/mol.

The polyethylene yarn satisfying the tenacity ratio and the melting index as such does not cause deterioration of physical properties even after being exposed to a high temperature for a long time, and thus, is advantageous for post-processing such as weaving or twisting.

In addition, the polyethylene yarn may have a polydispersity index (PDI) of 1 to 20, specifically 3 to 15, and more specifically 5 to 10, and at this time, may have a weight average molecular weight (Mw) of 600,000 g/mol or less, specifically 80,000 to 500,000 g/mol, and more specifically 200,000 to 400,000 g/mol. The polyethylene yarn having the polydispersity index and the weight average molecular weight in the above ranges secures processability, for example, has good melt flowability during melt extrusion of the yarn, prevents occurrence of thermal decomposition, and has no occurrence of breakage during drawing, and thus, a yarn having uniform physical properties may be manufactured and a yarn having excellent durability may be provided. Here, a number average molecular weight is not limited as long as the PDI value described above is satisfied for the weight average molecular weight described above.

In addition, the polyethylene yarn may have a crystallinity of 60 to 90%, preferably 60 to 85%, even more preferably 65 to 85% but is not limited thereto. The crystallinity of the polyethylene yarn may be derived in the crystallinity analysis using an X-ray diffraction analyzer. Within the range of the crystallinity satisfying the above, heat is rapidly diffused and dissipated through lattice vibration called a "phonon" in the direction of a molecular chain connected by a covalent bond of polyethylene, and thus, the yarn may have excellent thermal conductivity.

Further, the polyethylene yarn may satisfy a crystal size in a fiber axis parallel direction (002 plane) of 200 Å or more and a crystal size in a fiber axis orthogonal direction (110 plane) of 110 Å or more as measured with an X-ray diffraction pattern using CuK α rays. Specifically, the crystal size in the fiber axis parallel direction may be 210 Å to 360 Å, and more specifically, 220 Å to 350 Å. In addition, the crystal size in the fiber axis orthogonal direction may be 120 Å to 190 Å, advantageously 130 Å to 180 Å, but is not limited thereto. However, within the range, the polyethylene yarn may express high strength and low shrinkage properties, satisfy excellent thermal resistant tenacity, and have an improved heat absorption rate, thereby having improved cool feeling.

In addition, the polyethylene yarn may satisfy a melting temperature of 130 to 140° C. Specifically, the melting temperature may be 138 to 140° C., but is not limited thereto. However, the yarn satisfying the melting temperature may maintain mechanical properties even at a relatively high temperature.

In addition, the polyethylene yarn may have a density of 0.93 to 0.97 g/cm$^3$, specifically 0.941 to 0.965 g/cm$^3$. The polyethylene yarn satisfies mechanical properties even in the case of being exposed to a high temperature for a long time, and has higher resistance to heat, so that it has a lower shrinkage.

Specifically, the polyethylene yarn may have a dry heat shrinkage of 1.5 to 3.5%, and specifically 2 to 3%, and more specifically 2.5% to 3%

Further, the polyethylene yarn has a strength of 1 to 25 g/d, as measured in accordance with ASTM D2256. The strength may be preferably 1 to 20 g/d, and more preferably 7 to 20 g/d. The polyethylene yarn satisfying the strength has a relatively high flexibility to have excellent weavability, thereby producing a fabric having better quality when manufactured into a fabric by weaving or knitting.

Hereinafter, the method of manufacturing a polyethylene yarn of the present invention will be described in detail. The manufacturing method is not limited as long as the polyethylene yarn of the present invention satisfies the ranges of the physical properties such as PDI, a tenacity ratio, and strength, and the following describes an embodiment.

First, melting polyethylene chips to obtain a polyethylene melt;

spinning the polyethylene melt through a spinneret having a plurality of nozzle holes;

cooling a plurality of filaments which are formed when the polyethylene melt is discharged from the nozzle holes, drawing the filaments at a total draw ratio of 5 to 20 times, and performing heat set; and winding the drawn and heat set multifilament yarn, may be included.

Detailed description of each step is as follows: first, polyethylene in the form of chips is introduced into an extruder to be melted, thereby obtaining a polyethylene melt.

The polyethylene chips may have a polydispersity index (PDI) of more than 5 and less than 9, preferably 5.5 to 8. In addition, the polyethylene chips may have a melt (MI) of 0.3 to 3 g/10 min, preferably 0.4 to 3 g/mol, and more preferably 0.7 to 3 g/mol. In addition, the polyethylene chips may have a weight average molecular weight (Mw) of 600,000 g/mol or less, specifically 80,000 to 600,000 g/mol, preferably 100,000 to 500,000 g/mol, and more preferably 200,000 to 400,000 g/mol.

The molten polyethylene is transported through a spinneret by a screw in the extruder and is extruded through a plurality of holes formed on the spinneret. The number of holes of the spinneret may be determined depending on the denier per filament (DPF) and the fineness of the yarn to be manufactured. For example, when a yarn having a total fineness of 75 deniers is manufactured, the spinneret may have 20 to 75 holes, and when a yarn having a total fineness of 450 deniers is manufactured, the spinneret may have 90 to 450, preferably 100 to 400 holes.

A melting process in the extruder and an extrusion process by the spinneret may be changed depending on the melt index of the polyethylene chips, but specifically, for example, may be performed at 150 to 315° C., preferably 220 to 300° C., and more preferably 250 to 290° C. That is, it is preferred that the extruder and the spinneret may be maintained at 150 to 315° C., preferably 220 to 300° C., and more preferably 250 to 290° C.

When the spinning temperature is lower than 150° C., polyethylene is not uniformly melted due to the low spinning temperature so that spinning may be difficult, and excessive shear stress occurs in the nozzle so that melt fracture becomes worse. However, when the spinning temperature is higher than 315° C., thermal decomposition of polyethylene is accelerated, so that it may be difficult to express physical properties at a target level. A ratio (L/D) of a hole length (L) to a hole diameter (D) of the spinneret may be 3 to 40. When L/D is less than 3, die swell occurs during melt extrusion and it becomes hard to control the elastic behavior of polyethylene, so that spinning properties become poor, and when L/D is more than 40, discharge non-uniformity due to pressure drop may occur along with breakage due to the necking of melt polyethylene passing through the spinneret.

As the molten polyethylene discharges from the holes of the spinneret, solidification of polyethylene starts due to a difference between a spinning temperature and room temperature to form filaments in a semi-solidified state. In the present specification, not only the filaments in a semi-solidified state but also completely solidified filaments are collectively referred to as "filaments".

The plurality of filaments are cooled in a cooling unit (or "quenching zone") to be completely solidified. The filaments may be cooled in an air cooling manner.

It is preferred that the cooling of the filaments in the cooling unit is performed so that the filaments are cooled to 15 to 40° C., using a cooling air at a wind speed of 0.2 to 1 m/sec. When the cooling temperature is lower than 15° C., elongation is insufficient due to supercooling so that breakage may occur in a drawing process, and when the cooling temperature is higher than 40° C., a fineness deviation between filaments is increased due to solidification unevenness and breakage may occur in a drawing process.

In addition, more uniform crystallization may be performed by performing multi-stage cooling in cooling in the cooling unit.

More specifically, the cooling unit may be divided into 2 or more sections. For example, when the cooling unit is composed of three cooling sections, it is preferred to design the cooling unit so that the temperature is gradually lowered from a first cooling unit to a third cooling unit. Specifically, for example, the first cooling unit may be set at 40 to 80° C., the second cooling unit may be set at 30 to 50° C., and the third cooling unit may be set at 15 to 30° C.

In addition, a wind speed is set highest in the first cooling unit, thereby manufacturing a fiber having a smoother surface. Specifically, the cooling unit may be set so that the first cooling unit is cooled to 40 to 80° C. using a cooling wind at a wind speed of 0.8 to 1 m/sec, the second cooling unit is cooled to 30 to 50° C. using a cooling wind at a wind speed of 0.4 to 0.6 m/sec, and the third cooling unit is cooled to 15 to 30° C. using a cooling wind at a wind speed of 0.2 to 0.5 m/sec, and by adjusting the cooling unit as described above, a yarn having higher crystallinity and a smoother surface may be manufactured.

Subsequently, the cooled and completely solidified filaments were sized by a sizing machine to form a multifilament.

The polyethylene yarn of the present invention may be manufactured by a direct spinning drawing (DSD) process. That is, the multifilaments are directly delivered to a multistage drawing unit including a plurality of godet roller units, and are drawn to a total draw ratio of 5 times to 20 times, preferably 8 times to 15 times and then wound on a winder.

As an example, it is preferred that a drawing step of using the plurality of godet rollers is performed by drawing in 2 or more multistages. Preferably, the drawing step may be performed by multi-stage drawing in 2 stages or more and 20 stages or less using a plurality of godet rollers. When the multi-stage drawing is performed in 2 stages or less than, rapid drawing occurs in each section of the godet rollers, so that a fluff occurrence frequency is increased and an initial modulus is increased in the manufacture of filament yarn, resulting in excessive stiffness of fabric. In addition, in the multi-stage drawing, when the drawing is performed in 20 stages or more, friction between filament yarn and a godet roller is increased to cause filament damage and single yarn.

In addition, even in the case of using polyethylene chips having a polydispersity index (PDI) of 5 to 10 and a melt index (MI) at 190° C. of 0.3 to 3 g/10 min, when the draw ratio, the drawing temperature, and the conditions of the number of stages according to the method of the present invention are not satisfied, the desired physical properties may not be satisfied. For example, during the drawing, a highest drawing temperature may be 100 to 150° C., and when the drawing temperature is lower than 100° C., an amount of heat transferred to the yarn is insufficient to lower draw efficiency, so that draw breakage severely occurs, and when the drawing temperature is higher than 150° C., filaments are bonded to lower yarn strength. Multi-stage drawing of 2 or more stages and a total draw ratio of 5 to 20 times may be performed. The highest drawing temperature is a highest temperature in a drawing section, and the total draw ratio is a final draw ratio of the fiber after the last drawing as compared with the fiber before drawing.

For example, the multi-stage drawing may be performed as multi-stage drawing of 2 stages or more, more specifically 4 stages or more and 20 stages or less, using a plurality of godet rollers. Among the plurality of godet rollers ($GR_1, \ldots GR_n$), the temperature of a first godet roller ($GR_1$) may be 50 to 80° C., and the temperature of a last godet roller ($GR_n$) may be 100 to 150° C. Each temperature of the remaining godet rollers other than the first and last godet roller units ($GR_1$ and $GR_n$) may be set to be equivalent to or higher than the temperature of the godet roller in the immediately preceding stage. The temperature of the last godet roller unit ($GR_n$) may be set to be equivalent to or higher than the temperature of the godet roller unit in the immediately preceding stage, but may be set to be somewhat lower than that.

In addition, in the last drawing section in the multi-stage drawing, shrinkage drawing (relaxation) at 1 to 5% may be imparted to provide a yarn having better durability.

More specifically, for example, the multi-stage drawing may be composed of a total of 4 stages of godet roller units, and the first godet roller unit may be set to be drawn to 2 to 4 times at 50 to 80° C., the second godet roller unit may be set to be drawn to 3 to 10 times at 70 to 100° C., the third godet roller unit may be set to be drawn to 1.1 to 3 times at 80 to 110° C., and the fourth godet roller unit may be set to be shrunk and drawn (relaxed) at 1 to 5% at 100 to 150° C. The first to fourth godet roller units may be composed of a plurality of godet rollers, respectively. Specifically, for example, the godet roller units may be composed of 2 or more, more specifically 2 to 10 godet rollers.

Alternatively, the multifilament yarn is wound up as an undrawn yarn once, and then the undrawn yarn is drawn, thereby manufacturing the polyethylene yarn of the present invention. That is, the polyethylene yarn of the present invention may be manufactured by a two-step process in which polyethylene is melt-spun to manufacture an undrawn yarn once, and then the undrawn yarn is drawn.

When a total draw ratio applied in a drawing process is less than 5, a degree of fiber orientation is low, so that the polyethylene yarn may not have a crystallinity of 60% or more and tenacity expression may be difficult.

However, when the total draw ratio is more than 20 times, breakage may occur, the strength of the finally obtained polyethylene yarn is not appropriate, so that the weavability of the polyethylene yarn may not be good, and the fabric manufactured using the yarn is too stiff, so that a user may feel uncomfortable.

When a linear speed of the first godet roller unit ($GR_1$) which determines the spinning speed of the melt spinning of the present invention is determined, the liner speeds of the remaining godet roller units are appropriately determined, so that a total draw ratio of 5 to 20 times, preferably 8 to 15 times is applied to the multifilaments in the multi-stage drawing unit.

The multi-stage drawing and the heat set of the multifilaments are simultaneously performed by the multi-stage drawing unit, and the multi-stage drawn multifilament is wound on a winder, thereby completing the polyethylene yarn of the present invention.

Since the polyethylene yarn of the present invention manufactured as described above has a high strength retention rate even when applied to a high temperature, shows low shrinkage, and has excellent heat tenacity resistance retention, it may be used in articles requiring post-processing. For example, it may be used as a general clothing material.

Since the fabric according to the present invention includes the polyethylene yarn described above, and includes a yarn having improved post-processability, the unique excellent mechanical properties of polyethylene such as high strength, low shrinkage, and heat tenacity resistance may be maintained even after a fabric manufacturing process such as knitting and weaving, and thus, the fabric may be applied to various fields such as safety goods, leisure goods, household goods, or cool feeling materials.

In addition, since a yarn having improved post-processability is included, the fabric manufactured therefrom may maintain mechanical properties even after post-processing such as dyeing or coating.

Specifically, the fabric according to the present invention may have a wear resistance degree of 500 or more, preferably 530 to 700, as measured in accordance with the standards of ASTM D3884.

The fabric according to the present invention may use the polyethylene yarn described above alone, and in order to further impart other functions, a heterogeneous yarn may be further included, but it is preferred to use the polyethylene yarn alone in terms of having both the post-processability and the cool feeling.

Hereinafter, the present invention will be described in more detail with reference to the examples and the comparative examples. However, the following examples and comparative examples are only one example for describing the present invention in more detail, and do not limit the present invention in any way.

The physical properties of the polyethylene yarn were measured as follows.

<Melt Index>

The melt index was measured in accordance with ASTM D1238, at a measurement temperature of 190° C., using a weight of 2.16 kg, and an amount flowing for 10 minutes was measured.

<Weight Average Molecular Weight (Mw) (g/mol) and Polydispersity (PDI)>

The weight average molecular weight (Mw) and the polydispersity (PDI, Mw/Mn) were determined, respectively, using the following gel permeation chromatography (GPC) after dissolving the polyethylene yarn in the following solvent.

Analytical instrument: HLC-8321 GPC/HT available from Tosoh Corporation
Column: PLgel guard (7.5×50 mm)+2×PLgel mixed-B (7.5×50 mm)
Column temperature 160° C.
Solvent: trichlorobenzene (TCB)+0.04 wt % of dibutyl-hydroxytoluene (BHT)
(after drying with 0.1% CaCl2)
Injector, Detector temperature: 160° C.
Detector: RI Detector
Flow velocity: 1.0 mL/min
Injection amount: 300 mL
Sample concentration: 1.5 mg/mL
Standard sample: polystyrene <Strength (g/d), Initial Modulus (g/d), and Elongation (%)>

According to the method of ASTM D2256, a universal tensile tester available from Instron (Instron Engineering Corp, Canton, Mass) was used to obtain a strain-stress curve of the polyethylene yarn. A sample length was 250 mm, a tensile speed was 300 mm/min, and an initial load was set to 0.05 g/d. The strength (g/d) and the elongation (%) were determined from a stress and a stretch at break, and the initial modulus (g/d) was determined from a tangent imparting a maximum gradient near the starting point of the curve. The measurement was performed five times for each yarn and the average was calculated.

<Tenacity Measurement>

According to the method of ASTM D885, a universal tensile tester available from Instron (Instron Engineering Corp, Canton, Mass) was used to measure the tenacity (g/d) of the polyethylene yarn. A sample length was 250 mm, a tensile speed was 300 mm/min, and an initial load was set to 0.05 g/d.

As shown in FIG. 1, the polyethylene yarn was cut to obtain a sample 200 having a length of 250 mm or longer, the sample was passed through a cylindrical glass tube 100 with both ends open, and the both ends of the sample were fixed to the both ends of the glass tube.

At this time, no load was applied to the sample. Thereafter, a hot air circulating annular heating furnace was used to perform heating for 30 minutes at a test temperature (50° C., 120° C.), and then the tenacity of the yarn sample was measured. Then, the sample was taken out from the heating furnace and slowly cooled down to room temperature (20±5° C.), and then the tenacity of the yarn sample was measured. The process was repeated a total of 5 times, and an average value was determined.

Then, a tenacity ratio was calculated using the following equation:

Ratio of tenacity (%)=(tenacity ($B$ or $C$) of polyethylene yarn at high temperature)/(tenacity ($A$) of polyethylene yarn at room temperature)×100    [Equation]

In the above equation, the high temperature may be a test temperature, specifically 50° C. or 120° C.

<Crystallinity of Yarn>

An XRD instrument (X-ray Diffractometer) [manufacturer: PANalytical, model name: EMPYREAN] was used to measure the crystallinity of the polyethylene yarn. Specifically, the polyethylene yarn was cut to prepare a sample having a length of 2.5 cm, the sample was fixed to a sample holder, and the measurement was performed under the following conditions:

Light source (X-ray Source): Cu-Kα radiation
Power: 45 kV×25 mA
Mode: continuous scan mode
Scan angle range (2Θ): 10 to 40°
Scan speed: 0.1°/sec
Calculation of crystallinity Crystallinity (%)=$I_C/(I_A+I_C)$×100

In the 2Θ range scanned using XRD, a crystalline area fraction of polyethylene is $I_C$ and a non-crystalline area fraction is $I_A$. The crystallinity is represented as a ratio of the fraction of the crystal area to the fraction of the crystalline area and the non-crystalline area of polyethylene.

<Dry Heat Shrinkage>

The sample was allowed to stand in a constant temperature and humidity room at 25° C. and a relative humidity of 65% for 24 hours. The sample was heat-shrunk under the conditions of 150° C.×30 minutes without tension, and was allowed to stand in a constant temperature and humidity room at 25° C. and a relative humidity of 65% for 24 hours. Change in length before and after shrinkage of the yarn was shown.

Shrinkage (%)=$(L_0-L_1)/L_0$×100

$L_0$: Length of a sample before heat shrinkage, after being allowed to stand in a constant temperature and humidity room at 25° C. and a relative humidity of 65% for 24 hours.

$L_1$: Length of a sample after heat shrinkage, after being allowed to stand in a constant temperature and humidity room at 25° C. and a relative humidity of 65% for 24 hours.

<Evaluation of Wear Resistance Degree>

The wear resistance degree of a knitted fabric manufactured using the polyethylene yarn according to the present invention was measured in accordance with the standards of ASTM D3884. A Martindale wear resistance meter was used as the evaluation instrument. The friction cloth used at this time was 320 Cw sandpaper and an applied load was 1,000 g.

Example 1

A polyethylene yarn including 240 filaments and having a total fineness of 500 deniers was manufactured.

Specifically, polyethylene chips having a density of 0.962 g/cm³, a weight average molecular weight (Mw) of 340,000 g/mol, a polydispersity index (PDI) of 7.5, and a melt index (MI at 190° C.) of 1.8 g/10 min were introduced to an extruder and melted. The molten polyethylene was extruded through a spinneret having 240 holes. L/D which is a ratio of a hole length to a hole diameter of the spinneret was 5. A spinneret temperature was 270° C.

Filaments formed by discharging from the nozzle holes of the spinneret were moved to a cooling unit and a drawing unit. The cooling unit and the drawing unit were composed of four sections, respectively, in which multifilaments were sequentially cooled and drawn. Cooling down to 50° C. in a first cooling unit, cooling down to 45° C. in second and third cooling units, and cooling down to 40° C. in a fourth cooling unit were performed. The drawing unit was composed of a total of four stages of godet roller units, and each godet roller unit was composed of 1 to 10 godet rollers. A first godet roller unit was set to have a highest temperature of 80° C., a second godet roller unit was set to have a highest temperature of 90° C., a third godet roller unit was set to have a highest temperature of 95° C., and a fourth godet roller unit was set to have a highest temperature of 120° C., and a draw ratio was set to be drawn to twice in the first godet roller unit, drawn to three times in the second godet roller unit, drawn to 1.4 times in the third godet roller, and shrunk and drawn (relaxed) at 4% in the fourth godet roller unit as compared with the third godet roller unit, and thus, drawing and heat set were performed at a total draw ratio of 8 times.

Subsequently, the drawn multifilament yarn was wound on a winder. A winding tension was 0.8 g/d.

The physical properties of the thus-manufactured yarn were measured, and are shown in the following Table 1.

In addition, the tenacity (A) of the yarn manufactured at room temperature was measured, the thus-manufactured yarn was heat-treated at 120° C. for 30 minutes, and then the tenacity (B) was measured.

A ratio (B/A) of the tenacity (B) measured after a heat treatment at 120° C. for 30 minutes to the tenacity (A) measured at room temperature and a ratio (C/A) of the tenacity (C) measured after a heat treatment at 50° C. for 30 minutes to the tenacity (A) measured at room temperature were calculated and are shown in Table 1.

<Manufacture of Fabric>

Knitting was performed using the polyethylene yarn manufactured above to manufacture a knitted fabric. The physical properties of the knitted fabric manufactured were measured, and are shown in the following Table 2.

Examples 2 and 3

Manufacture was performed in the same manner as in Example 1, except that the conditions were changed as shown in Table 1.

In addition, the physical properties of the fabric manufactured in the same manner as in Example 1 were measured and are shown in Table 2.

Example 4

A fabric was manufactured in the same manner as in Example 1, except the following: the cooling unit and the drawing unit were composed of two sections, respectively, and specifically, cooling down to 50° C. in the first cooling unit and cooling down to 40° C. in the second cooling unit were performed; the drawing unit was composed of a total of two stages of godet roller unit, and the first godet roller unit was set to have a highest temperature of 80° C. and the second godet roller unit was set to have a highest temperature of 120° C.; and a draw ratio was adjusted to 4.4 times in the first godet roller unit and 3 times in the second godet roller unit so that a total draw ratio was 13 times.

Example 5

A yarn was manufactured in the same manner as in Example 1, except that polyethylene chips having a density of 0.961 g/cm$^3$, a weight average molecular weight (Mw) of 340,000 g/mol, a polydispersity index (PDI) of 5.5, and a melt index (MI at 190° C.) of 1.7 g/10 min were used, and a total draw ratio was adjusted to 13 times.

Example 6

A yarn was manufactured in the same manner as in Example 1, except that polyethylene chips having a density of 0.961 g/cm$^3$, a weight average molecular weight (Mw) of 340,000 g/mol, a polydispersity index (PDI) of 8, and a melt index (MI at 190° C.) of 1.6 g/10 min were used, and a total draw ratio was adjusted to 13 times.

COMPARATIVE EXAMPLE 1

A yarn was manufactured in the same manner as in Example 1, except that polyethylene chips having a density of 0.960 g/cm$^3$, a weight average molecular weight (Mw) of 200,000 g/mol, a polydispersity index (PDI) of 7.5, and a melt index (MI at 190° C.) of 5 g/10 min were used, and a total draw ratio was adjusted to 11 times.

In addition, the physical properties of the fabric manufactured in the same manner as in Example 1 were measured and are shown in Table 2.

TABLE 1

| | | Example 1 | Example 2 | Example 3 | Example 4 | Example 5 | Example 6 | Comparative Example 1 |
|---|---|---|---|---|---|---|---|---|
| Chip physical properties | Mw (g/mol) | 340,000 | 340,000 | 340,000 | 340,000 | 340,000 | 340,000 | 200,000 |
| | MI (g/10 min) | 1.8 | 1.8 | 1.8 | 1.8 | 1.7 | 1.6 | 5 |
| Number of cooling sections | | 4 | 4 | 4 | 2 | 4 | 4 | 4 |
| Number of drawing sections | | 4 | 4 | 4 | 2 | 4 | 4 | 4 |
| Total draw ratio (times) | | 8 | 11 | 13 | 13 | 13 | 13 | 11 |
| Relaxation rate (%) | | 4 | 4 | 4 | 4 | 4 | 4 | 4 |
| Winding tension (g/d) | | 0.8 | 0.8 | 0.8 | 0.8 | 0.8 | 0.8 | 0.8 |
| Physical properties of yarn | MI (g/10 min) | 2.2 | 2.1 | 2.9 | 2.9 | 2.1 | 2.3 | 8.9 |
| | PDI | 7.5 | 7.5 | 7.5 | 7.5 | 5.5 | 8 | 7.5 |
| | Crystallinity (%) | 70 | 72 | 74 | 72 | 73 | 74 | 70 |
| | Strength (g/d) | 12.4 | 13.2 | 14.4 | 12.5 | 14.7 | 14.5 | 6.1 |
| | Melting temperature (° C.) | 138 | 139 | 140 | 138 | 140 | 140 | 137 |
| | Initial modulus (g/d) | 210 | 235 | 249 | 250 | 241 | 239 | 50 |
| | Elongation (%) | 9.5 | 8.1 | 7.0 | 8.9 | 6.8 | 6.9 | 28 |
| | B/A(%) | 90 | 96 | 97 | 86 | 93 | 89 | 82 |
| | C/A(%) | 96 | 97 | 99 | 92 | 98 | 98 | 89 |
| | Dry heat shrinkage (%) | 2.8 | 2.6 | 2.5 | 3.2 | 2.5 | 2.5 | 4.0 |

[00138] [Table 2] Physical properties of fabric

|  | Example 1 | Example 2 | Example 3 | Example 4 | Example 5 | Example 6 | Comparative Example 1 |
|---|---|---|---|---|---|---|---|
| Wear resistance degree (cycles) | 550 | 610 | 690 | 510 | 665 | 670 | 210 |

The polyethylene yarn according to the present invention may maintain a certain or higher level of tenacity in a high temperature environment to have excellent post-processability.

In addition, the fabric according to the present invention includes a polyethylene yarn having excellent post-processability to maintain unique excellent mechanical properties of polyethylene, and may be applied to various fields such as safety goods, leisure goods, household goods, or cool feeling materials.

What is claimed is:

1. A polyethylene yarn having:
a melting index (MI) of 0.3 to 3 g/10 min as measured in accordance with ASTM D1238, a ratio (B/A) of a tenacity (B) measured after a heat treatment at 120° C. for 30 minutes to a tenacity (A) measured at room temperature of 87% or more, and a ratio (C/A) of a tenacity (C) measured after a heat treatment at 50° C. for 30 minutes to the tenacity (A) measured at room temperature of 95% or more, in accordance with ASTM D885.

2. The polyethylene yarn of claim 1, wherein the polyethylene yarn has a crystallinity of 60 to 85%.

3. The polyethylene yarn of claim 1, wherein the polyethylene yarn satisfies a crystal size in a fiber axis parallel direction (002 plane) of 200 Å or more and a crystal size in a fiber axis orthogonal direction (110 plane) of 110 Å or more, as measured with an X-ray diffraction pattern using CuK α rays.

4. The polyethylene yarn of claim 1, wherein the polyethylene yarn has a melting temperature of 130 to 140° C.

5. The polyethylene yarn of claim 1, wherein the polyethylene yarn has a density of 0.93 to 0.97 g/cm$^3$.

6. The polyethylene yarn of claim 1, wherein the polyethylene yarn has a dry heat shrinkage of 2.5% or more.

7. The polyethylene yarn of claim 1, wherein the polyethylene yarn has a strength of 1 to 20 g/d, as measured in accordance with ASTM D2256.

8. The polyethylene yarn of claim 1, wherein the polyethylene yarn has a cutting elongation of 20% or less, as measured in accordance with ASTM D2256.

9. A fabric comprising the polyethylene yarn of claim 1.

10. The fabric of claim 9, wherein the fabric has a wear resistance degree of 500 or more.

* * * * *